United States Patent
Chiu (10) Patent No.: US 7,432,671 B1
(45) Date of Patent: Oct. 7, 2008

(54) METHOD AND APPARATUS FOR A LEVEL-SHIFT INVERTER FOR CATHODE RAY TUBE BLANKING

(75) Inventor: Hon Kin Chiu, Hayward, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 345 days.

(21) Appl. No.: 10/951,976

(22) Filed: Sep. 28, 2004

(51) Int. Cl.
  *G09G 1/04* (2006.01)
(52) U.S. Cl. .......................... 315/384; 315/379; 345/11
(58) Field of Classification Search .................. 315/387, 315/364, 372, 379, 383–384, 390; 345/10–13, 345/204; 348/626, 380
See application file for complete search history.

(56) References Cited

U.S. PATENT DOCUMENTS

| | | | | |
|---|---|---|---|---|
| 3,591,824 A | * | 7/1971 | Hanbicki | 315/385 |
| 3,701,844 A | * | 10/1972 | Allen | 348/652 |
| 3,760,099 A | * | 9/1973 | Kong | 348/673 |
| 3,995,197 A | * | 11/1976 | Caswell | 315/383 |
| 4,200,882 A | * | 4/1980 | Janssen | 348/657 |
| 4,293,875 A | * | 10/1981 | Katz | 348/707 |
| 4,361,785 A | * | 11/1982 | Stapleton | 315/389 |
| 4,500,879 A | * | 2/1985 | Smith et al. | 345/16 |
| 5,036,257 A | * | 7/1991 | Norman et al. | 315/381 |
| 5,089,754 A | * | 2/1992 | George | 315/386 |
| 5,337,090 A | * | 8/1994 | Ogino et al. | 348/626 |
| 5,532,712 A | * | 7/1996 | Tsuda et al. | 345/87 |
| 5,546,048 A | * | 8/1996 | Sano et al. | 330/263 |
| 6,323,704 B1 | * | 11/2001 | Pelley et al. | 327/112 |
| 2002/0121868 A1 | * | 9/2002 | Van Lieshout et al. | 315/387 |

* cited by examiner

*Primary Examiner*—Thuy Vinh Tran
*Assistant Examiner*—Tung X Le
(74) *Attorney, Agent, or Firm*—Darby & Darby PC; Matthew M. Gaffney (57) ABSTRACT

A level-shifting inverting circuit provides a blanking signal to Grid 1 of a CRT. The circuit provides the blanking signal from a blanking logic signal according to a voltage transfer characteristic that is substantially similar to the voltage transfer characteristic of a standard CMOS inverter. Also, the level-shifting inverting circuit includes a switch circuit that includes a differential pair. The differential pair has the blanking logic signal at one input, and a bias signal at the other input. The switch circuit is coupled to a voltage divider that provides an output voltage that is pre-determined by a resistor ratio when the switch circuit is open. If the blanking logic signal is low, the switch circuit is open. Conversely, if the blanking logic signal is high, the switch circuit is closed, and sinks current from the voltage divider, causing the output voltage to correspond to a second pre-determined voltage level.

21 Claims, 5 Drawing Sheets

METHOD AND APPARATUS FOR A LEVEL-SHIFT INVERTER FOR CATHODE RAY TUBE BLANKING

FIELD OF THE INVENTION

The invention is related to cathode ray tubes (CRTs), and in particular, to a method and apparatus for driving a control grid of a CRT employing an output voltage transfer characteristic like that of a CMOS inverter.

BACKGROUND OF THE INVENTION

A conventional CRT creates an image on a phosphor coated display screen by focusing a beam of electrons onto the screen and thus making the phosphors emit visible light. The electron beam is typically formed by first causing a cathode inside the vacuum of the CRT to emit electrons by applying a differential voltage between the cathode and a grid. A CRT typically includes four grids including a control grid (referred to as Grid 1 or G1). The CRT may have one or more anodes to attract, focus, and accelerate the electrons. Thus, the anodes may collimate the electrons into a tight beam hitting a spot of the display screen. By creating currents in coils outside the CRT, a magnetic field is created within the CRT to direct the electron beam at any desired spot of the display screen.

Typically, the image is displayed on the CRT by scanning the electron beam across the screen, from left to right. When the end of each line is reached, the electron beam moves from right to left to reach the beginning of the next line, a process called horizontal retrace. Once all of the lines on the screen are traced, the electron beam moves from the bottom of the screen to the top of the screen during a vertical retrace interval.

During both the horizontal and vertical retrace intervals, blanking may be performed. During blanking, the electron gun is biased at a potential such that the electron beam is cut off or the retrace lines are invisible. Blanking is typically performed by applying a large negative voltage to G1 during the retrace interval.

In order to provide a large negative voltage to G1, a logic signal must be converted into a signal with a significantly larger voltage swing. This is typically accomplished by employing a linear amplifier to amplify the logic signal.

BRIEF DESCRIPTION OF THE DRAWINGS

Non-limiting and non-exhaustive embodiments of the present invention are described with reference to the following drawings, in which.

DETAILED DESCRIPTION

Various embodiments of the present invention will be described in detail with reference to the drawings, where like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

Throughout the specification and claims, the following terms take at least the meanings explicitly associated herein, unless the context dictates otherwise. The meanings identified below are not intended to limit the terms, but merely provide illustrative examples for the terms. The meaning of "a," "an," and "the" includes plural reference, and the meaning of "in" includes "in" and "on." The phrase "in one embodiment," as used herein does not necessarily refer to the same embodiment, although it may. The term "coupled" means at least either a direct electrical connection between the items connected, or an indirect connection through one or more passive or active intermediary devices. The term "circuit" means at least either a single component or a multiplicity of components, either active and/or passive, that are coupled together to provide a desired function. The term "signal" means at least one current, voltage, charge, temperature, data, or other signal. Where either a field effect transistor (FET) or a bipolar junction transistor (BJT) may be employed as an embodiment of a transistor, the scope of the words "gate", "drain", and "source" includes "base", "collector", and "emitter", respectively, and vice versa.

Briefly stated, the invention is related to a level-shifting inverting circuit that is configured to provide a blanking signal to the control grid (G1) of a CRT. The circuit provides the blanking signal from a blanking logic signal according to a voltage transfer characteristic that is substantially similar to the voltage transfer characteristic of a standard CMOS inverter. Also, the level-shifting inverting circuit includes a switch circuit that includes a differential pair. The differential pair has the blanking logic signal at one input, and a bias signal at the other input. The switch circuit is coupled to a voltage divider that provides an output voltage that is pre-determined by a resistor ratio when the switch circuit is open. If the blanking logic signal is low, the switch circuit is open. Conversely, if the blanking logic signal is high, the switch circuit is closed, and sinks current from the voltage divider, causing the output voltage to correspond to a second pre-determined voltage level.

Figure 1:
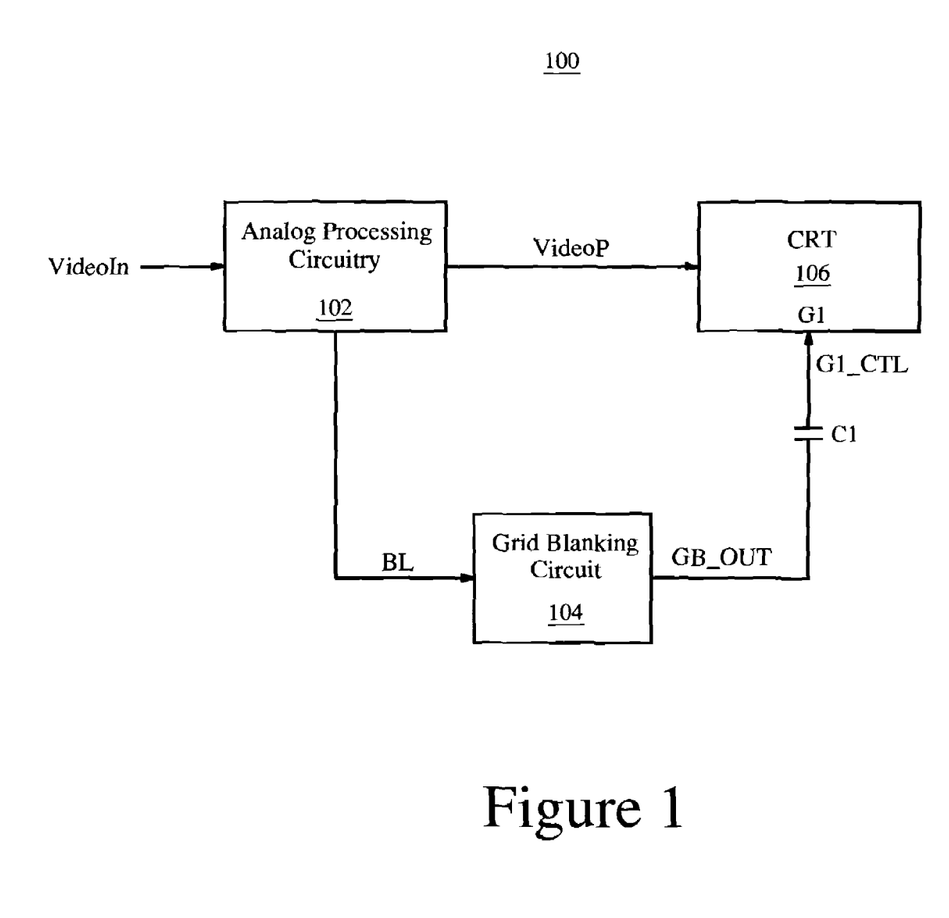
FIG. 1 illustrates a block diagram of an embodiment of a CRT system.

FIG. 1 illustrates a block diagram of an embodiment of CRT system 100. CRT system 100 includes CRT 106, analog processing circuitry 102, grid blanking circuit 104, and capacitor C1.

Analog processing circuitry 102 is configured to provide various analog processing functions on input video signal VideoIn. Signal VideoIn may include an NTSC signal, PAL signal, and the like. Analog processing functions performed by analog processing circuitry 102 may include extracting timing information from signal VideoIn, performing a driving function, and the like. Analog processing circuitry 102 is arranged to provide processed video signal VideoP from signal VideoIn. Further, analog processing circuitry 102 is arranged to provide blanking logic signal BL based on signal VideoIn. In one embodiment, analog processing circuitry 102 is arranged to provide signal BL such that signal BL is high during vertical retrace intervals, and low otherwise. Signal BL may have a typical logic voltage swing such as 5V, 3.3V, or the like.

CRT 106 is arranged to provide an image on a screen of the CRT based on signal VideoP. Although not shown, CRT 106 may include components such as a cathode, high-voltage grids including a control grid (G1), and a phosphor screen. Further, CRT 106 is arranged to blank when a relatively large negative voltage is applied to G1.

Grid blanking circuit 104 is arranged to provide grid blanking circuit output signal GB_OUT from signal BL.

Capacitor C1 is arranged to capacitively couple signal GB_OUT (which is substantially a DC signal) to provide signal G1_CTL (which is an AC signal). This way, when signal BL is high, signal G1_CTL may apply −40V to G1 in order to blank CRT 106.

Figure 2:
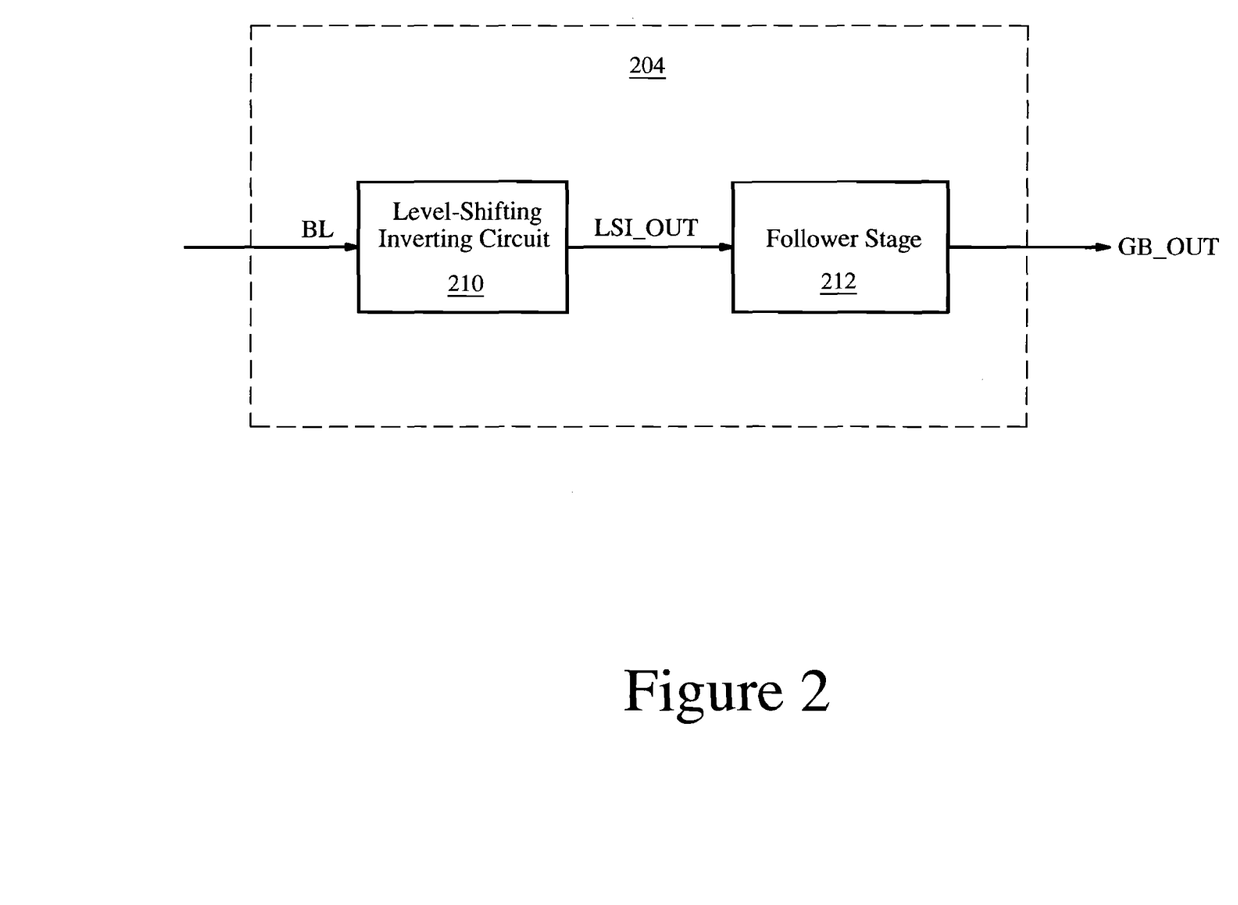
FIG. 2 shows a block diagram of an embodiment of the grid blanking circuit of FIG. 1.

FIG. 2 shows a block diagram of an embodiment of grid blanking circuit 204. An embodiment of grid blanking circuit 204 may be employed as an embodiment of grid blanking circuit 104 of FIG. 1. Grid blanking circuit 204 includes level-shifting inverting circuit 210, and may further include optional follower stage 212.

In operation, level-shifting inverting circuit 210 provides signal LSI_OUT such that the output swing of signal LSI_OUT is appropriate for blanking of G1, and such that the signal LSI_OUT has an output voltage transfer characteristic that is similar to that of a standard CMOS inverter. In one embodiment, level-shifting inverting circuit 106 has a switching threshold of 2.5V, signal BL has a voltage swing of 0V-5V, and signal LSI_OUT is provided at 80V if signal BL is from about 0V to 2V, and signal LSI_OUT is provided at 40V if signal BL is from about 3V to 5V.

In one embodiment, the switching threshold of level-shifting inverting circuit 106 is set by a bias voltage (not shown in FIG. 2).

In one embodiment, follower stage 212 is arranged to provide signal GB_OUT from signal LSI_OUT.

Figure 3:
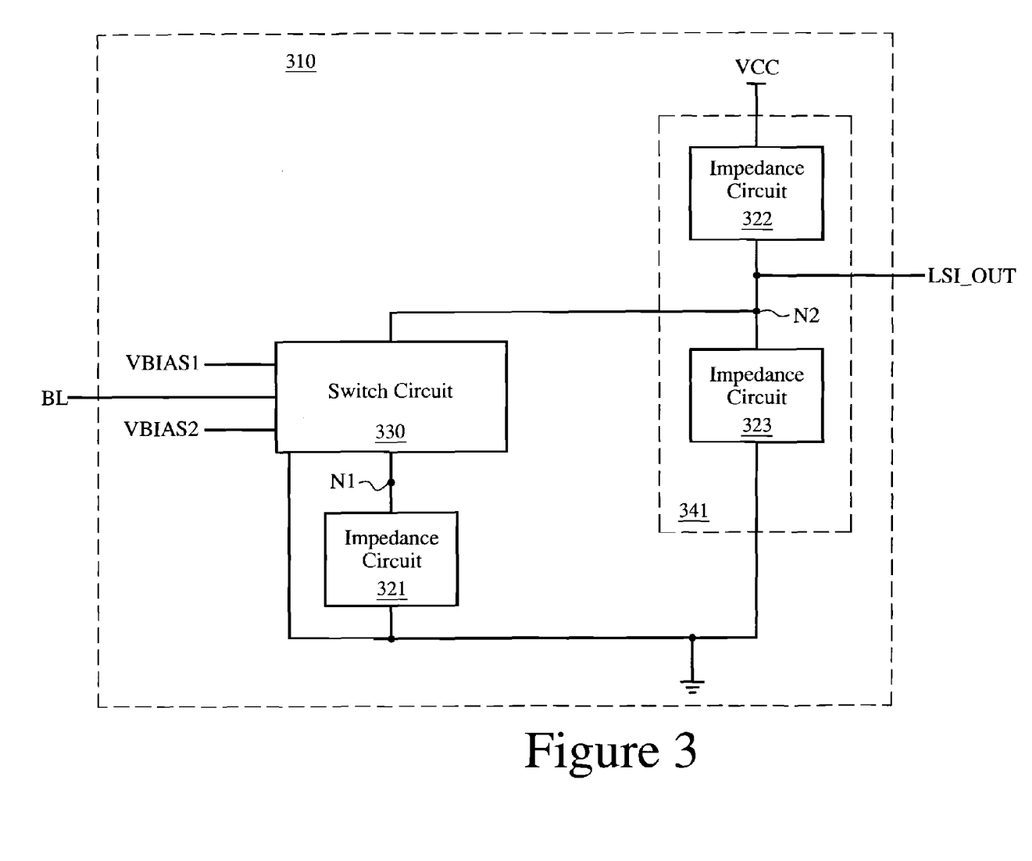
FIG. 3 illustrates a block diagram of a level-shifting inverting circuit which may be employed as an embodiment of the level-shifting inverting circuit of FIG. 2.

FIG. 3 illustrates a block diagram of level-shifting inverting circuit 310. An embodiment of level-shifting inverting circuit 310 may be employed as an embodiment of level-shifting inverting circuit 210 of FIG. 2. Level-shifting inverting circuit 310 includes impedance circuit 321, voltage divider circuit 341, and switch circuit 330. Voltage divider 341 includes impedance circuits 322 and 323.

In one embodiment, impedance circuits 321-323 may each include a single resistor. In other embodiments, one or more of the impedance circuits may include two or more resistors coupled in series and/or in parallel to provide a combined equivalent resistance. In one embodiment, one of more of the impedance circuits may include one or more transistors that are biased to operate substantially as resistors.

Switch circuit 330 is arranged to open if signal BL corresponds to a low logic level, and further arranged to close if signal BL corresponds to a high logic level. In one embodiment, switch circuit 330 does not operate as an ideal switch in the sense of providing zero resistance between nodes N1 and N2 if switch 330 is closed. Rather, when switch 330 is closed, a current path is provided between nodes N1 and N2, and node N1 is biased at a voltage that is based on bias voltage VBIAS2. Also, the switching threshold of switch circuit 330 is substantially equal to the voltage of VBIAS2. In one embodiment, voltage VBIAS2 is provided externally. In another embodiment, voltage VBIAS2 is provided internally to switch circuit 330 at a pre-determined level, for example, by employing a voltage divider. In yet another embodiment, voltage VBIAS2 is provided internally to switch circuit 330 at a pre-determined voltage level, but is modifiable based on an external signal.

Voltage divider 341 is arranged to provide voltage LSI_OUT at one of two pre-determined voltage levels, depending on whether switch circuit 330 is open or closed. If switch circuit 330 is open, voltage divider circuit operates substantially as a standard voltage divider, providing voltage LSI_OUT based on voltage Vcc and the impedances of impedance circuits 322 and 323. In one embodiment, voltage divider circuit 341 is arranged to provide voltage LSI_LOUT at a voltage of substantially 80V if switch circuit 330 is open. However, if switch circuit 330 is closed, switch circuit 330 and impedance circuit 321 are configured to sink current away from node N2, such that the voltage of node N2 corresponds to a different pre-determined voltage level that is less then the pre-determined voltage at node N1 when switch circuit 330 is open. In one embodiment, when switch circuit 330 is closed, the voltage at node N2 is substantially 40V.

Figure 4:
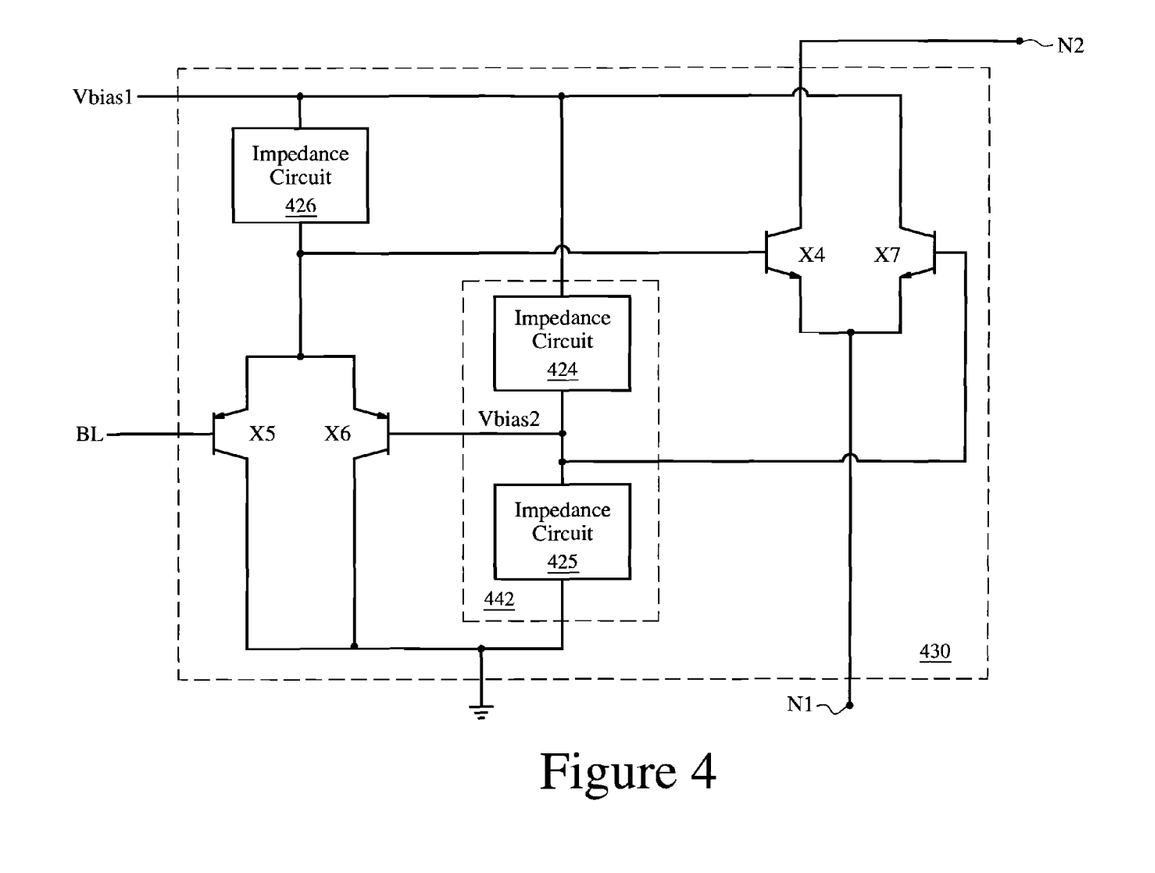
FIG. 4 shows a block diagram of an embodiment of the switch circuit of FIG. 3.

FIG. 4 shows a block diagram of an embodiment of switch circuit 430. An embodiment of switch circuit 430 may be employed as an embodiment of switch circuit 330 of FIG. 3. Switch circuit 430 includes transistors X4-X7, impedance circuit 426, and voltage divider 442. Voltage divider 442 includes impedance circuit 424 and impedance circuit 425.

In switch circuit 430, signal Vbias2 is provided by voltage divider 442 based on voltage Vbias1 and an impedance ratio of voltage divider 442.

Although one embodiment of switch circuit 430 is illustrated in FIG. 4, many alternative embodiments are within the spirit and scope of the invention.

For example, the embodiment of switch circuit 430 illustrated in FIG. 4 includes two differential pairs arranged in a pnp/npn configuration. The pnp/npn configuration is employed to compensate for VBE temperature drift in the embodiment shown. However, in one embodiment, switch circuit 430 includes one differential pair rather than two.

As another example, although bipolar junction transistors (BJTs) are illustrated in FIG. 4, in other embodiments, types of transistors other than BJTs may be employed.

Figure 5:
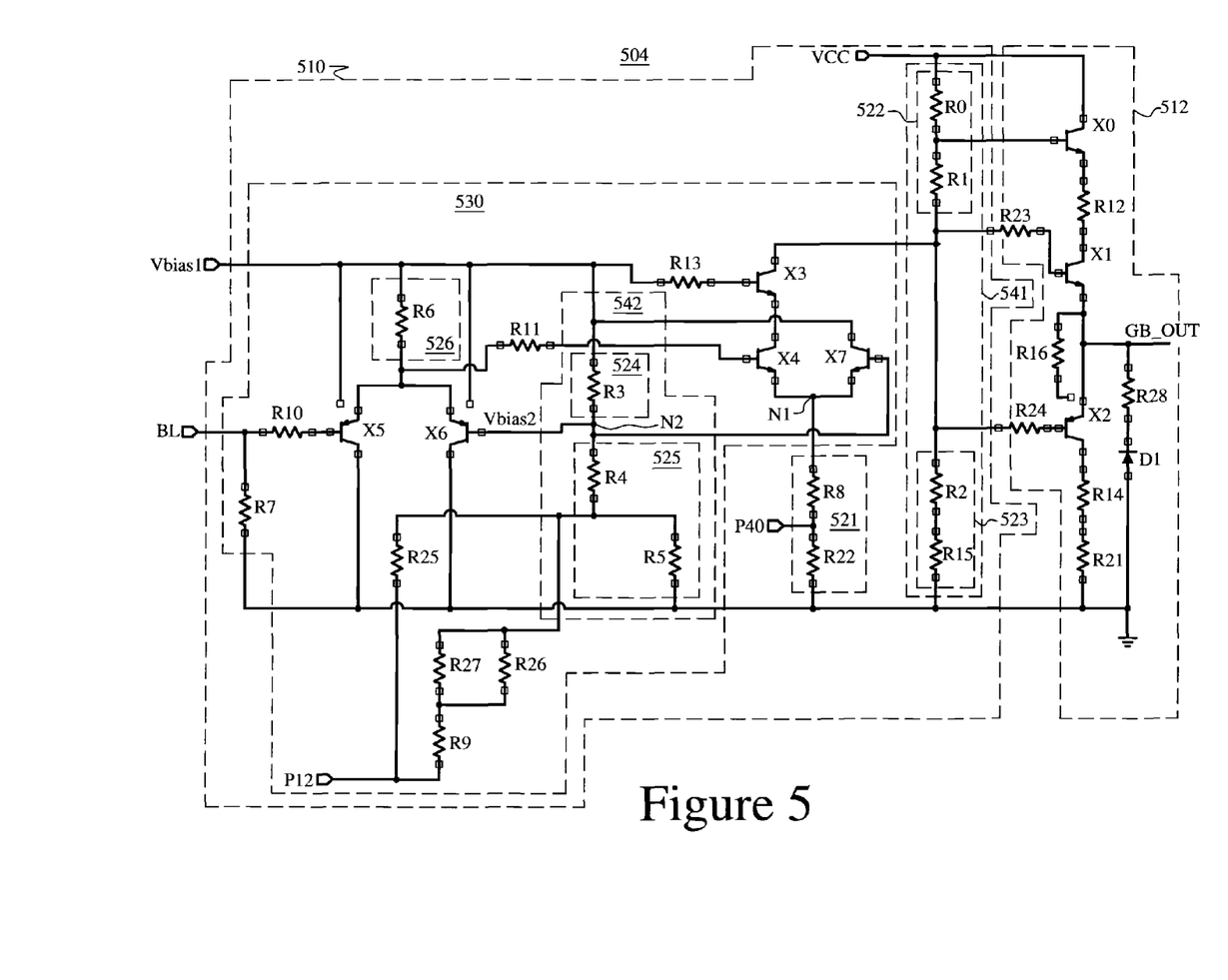
FIG. 5 schematically illustrates an embodiment of the grid blanking circuit of FIG. 2, arranged in accordance with aspects of the invention.

FIG. 5 schematically illustrates an embodiment of grid blanking circuit 504. Components in grid blanking circuit 504 may operate in a substantially similar manner to similarly-named components in grid blanking circuit 204 of FIG. 2, level-shifting inverting circuit 310 of FIG. 3, and clock circuit 430 of FIG. 4, and may operate in a different manner in some ways. Follower stage 512 includes transistors X0-X2, diode D1, and resistors R12, R14, R16, R21, R23, R24, and R28. Also, switch circuit 530 further includes transistor X3 and resistors R7, R9-11, R23, and R25-27. Impedance circuit 521 includes resistors R8 and R28, impedance circuit 522 includes resistors R0 and R1, impedance circuit 523 includes resistors R2 and R15, impedance circuit 524 includes resistor R3, impedance circuit 525 includes resistors R4 and R5, and impedance circuit 526 includes resistor R6.

In operation, voltage divider 541 provides a voltage of substantially Vcc*(R0+R1)/(R0+R1+R+R15) if signal BL corresponds to a logic low, and provides a voltage of substantially [Vcc*(R0+R1)/(R0+R1+R2+R15)]−[(R2*R15)* Vbias2/(R8+R22)] if signal BL corresponds to a logic high.

Transistors X1 and X2 are arranged to operate as emitter followers.

Level-shifting inverting circuit 510 is arranged to operate substantially as follows when signal BL corresponds to a logic high. Transistor X5 is off (cutoff region of operation). Accordingly, transistor X6 is on (forward-active region of operation). Transistor X6 operates as an emitter follower, so that the voltage at the emitter of transistor X6 is one VBE above voltage Vbias2, where it is assumed that the forward-biased VBE of each transistor in switch circuit 530 is substantially the same. Transistor X4 operates as an emitter follower, and so that voltage at the emitter of transistor X4 is substantially Vbias2 (Vbias2+VBE−VBE). Accordingly, when signal BL corresponds to a logic high, the voltage at node N1 is biased at a third bias voltage that is substantially equal to Vbias2. Since the emitter of transistor X7 is coupled to the emitter of transistor X4, and the base of transistor X7 is coupled to node N2, VBE of transistor X7 is substantially zero. Accordingly, transistor X7 is off. The emitter current of transistor X4 is substantially given by Vbias2/(R8+R22). Accordingly, the collector current of transistor X8 is substantially equal to Vbias2/(R8+R22). In one embodiment, Vbias1 is approximately 8V, and resistors R3, R4, and R5 are preselected such that voltage Vbias2 is approximately 2.87V.

As a result of the operation discussed above, a current of approximately Vbias2/(R8+R22) sinks away from voltage divider 541 when signal BL corresponds to a logic high.

Level-shifting inverting circuit 510 is arranged to operate substantially as follows when signal BL corresponds to a logic low. Transistor X5 is on, and operates as an emitter follower, such that the voltage at the emitter of transistor X5 is substantially O+VBE. Accordingly, transistors X4 and X6 are off. Since transistor X4 is off, transistor X7 is on. Accordingly, the voltage at the emitter of transistor X7 is Vbias2-VBE. Also, since transistor X4 is off, the emitter current of transistor X3 is substantially zero. Accordingly, transistor X3 is off.

As a result of the operation discussed above, there is substantially no current from node N2 to node N1 when signal BL corresponds to a logic low.

In one embodiment, grid blanking circuit 504 is designed based on the assumption that Vbias1 will be provided at 8V, but modifiable for the case that Vbias is provided at 12V. In this embodiment, if Vbias is provided at 12V, p12 is tied to ground. This way, resistors R9, R26, and R27 sink current away from voltage divider 542 such that voltage divider 542 provides voltage Vbias2 at substantially the same voltage as if voltage Vbias2 were provided at 8V and pin p12 were left floating.

Further, pin p40 may be employed to adjust the voltage provided by grid blanking circuit 504 when signal BL corresponds to a logic high.

The above specification, examples and data provide a description of the manufacture and use of the composition of the invention. Since many embodiments of the invention can be made without departing from the spirit and scope of the invention, the invention also resides in the claims hereinafter appended.

What is claimed is:

1. A circuit for cathode ray tube blanking, comprising:
a first impedance circuit that is coupled to a first node;
a voltage divider circuit that includes a second impedance circuit and a third impedance circuit, wherein the second and third impedance circuits are coupled together at a voltage divider output node; and
a switch circuit that is coupled between the first node and the voltage divider output node, wherein the switch circuit is arranged to open and close based on an input voltage and a first bias voltage such that the first bias voltage acts as a logic threshold of the switch circuit, the switch circuit is closed if the input voltage corresponds to a logic high relative to the logic threshold, and such that the switch circuit is open if the input voltage corresponds to a logic low relative to the logic threshold; and
wherein the switch circuit is further arranged to, at least if the switch circuit is closed, provide a second bias voltage to the first node such that the second bias voltage is based, in part, on the first bias voltage.

2. The circuit of claim 1, wherein the first, second, and third impedance circuits each include a resistor.

3. The circuit of claim 1, wherein the first impedance circuit includes a first resistor and a second resistor, and further includes a pin that is coupled to another node that is between the first and second resistors.

4. The circuit of claim 1, wherein a peak-to-peak voltage swing of the input voltage is approximately at most five volts, the voltage divider circuit is arranged to provide a voltage divider output signal at the voltage divider output node, and wherein the voltage divider circuit and the switch circuit are configured such that a peak-to-peak voltage swing of the voltage divider output signal is approximately at least fifteen volts.

5. The circuit of claim 4, wherein voltage divider circuit and the switch circuit are configured such that the voltage divider output signal is about 80 volts if the input voltage corresponds to a logic low, and such that the voltage divider output signal is about 40 volts if the input voltage corresponds to a logic high.

6. The circuit of claim 1, wherein the switch circuit includes another voltage divider circuit that is arranged to, if the switch circuit is closed, provide a third bias voltage from the first bias voltage, and wherein the switch circuit is arranged to provide the second bias voltage based on the third bias voltage such that the second bias voltage is substantially equal to the third bias voltage.

7. The circuit of claim 6, wherein the other voltage divider circuit includes a first resistor, a second resistor, and a third resistor, wherein the other voltage divider circuit is arranged to provide the third bias voltage at a node between the first and second resistors, the switch circuit further includes a resistor circuit and an pin, the switch circuit further includes a resistor circuit that is coupled between the pin and another node that is between the second and third resistors, and wherein the other voltage divider circuit and the resistor circuit are arranged such that the third bias voltage is adjustable based on a signal applied to the pin.

8. The circuit of claim 1, wherein the switch circuit includes a differential pair.

9. The circuit of claim 8, wherein the switch circuit further includes another differential pair.

10. The circuit of claim 8, wherein the differential pair includes a first transistor and a second transistor, the first and second transistors each include a gate, the gate of the first transistor is arranged to receive the input voltage, and wherein the gate of the second transistor is arranged to receive a third bias voltage that is based, in part, on the first bias voltage.

11. The circuit of claim 10, wherein the switch circuit further includes a fourth impedance circuit that is coupled between a first bias voltage node and the emitter of the first transistor, and wherein the switch circuit is arranged to receive the first bias voltage at the first bias node.

12. The circuit of claim 10, wherein the switch circuit further includes another differential pair, the other differential pair includes a third transistor and a fourth transistor, the third and fourth transistors each include a gate, the fourth transistor includes a collector, the first and second transistors each include an emitter, the gate of the third transistor is coupled to the emitters of the first and second transistors, the collector of the fourth transistor is arranged to receive the first bias voltage, and wherein the base of the fourth transistor is coupled to the base of the second transistor.

13. The circuit of claim 12, further comprising a fifth transistor that includes a base, a collector, and an emitter, wherein the emitter of the fifth transistor is coupled to the collector of the third transistor, the base of the fifth transistor is coupled to the collector of the fourth transistor, and wherein the collector of the fifth transistor is coupled to the voltage divider output node.

14. The circuit of claim 13, further comprising:
a first resistor that is coupled to the base of the first transistor;
a second resistor that is coupled between the emitter of the first transistor and the collector of the fourth transistor; and
a third resistor that is coupled between the collector of the fourth transistor and the base of the fifth transistor.

15. A circuit for cathode ray tube blanking, comprising:
a level-shifting inverting circuit that is arranged to receive a blanking logic signal, and to provide an intermediate blanking voltage from the blanking logic signal such that:
the intermediate blanking voltage is level-shifted relative to the blanking logic signal such that a voltage swing of the intermediate blanking signal is appropriate for blanking of a control grid of a cathode ray tube, and
such that an output transfer characteristic of the intermediate blanking voltage is substantially similar to the output transfer characteristic of a CMOS inverter; and
a follower stage that is arranged to provide an output signal from the intermediate blanking voltage.

16. A circuit for cathode ray tube blanking comprising:
a level-shifting inverting circuit that is arranged to receive a blanking logic signal, and to provide an intermediate blanking voltage from the blanking logic signal such that: the intermediate blanking voltage is level-shifted relative to the blanking logic signal such that a voltage swing of the intermediate blanking signal is appropriate for blanking of a control grid of a cathode ray tube; and
a follower stage that is arranged to provide an output signal from the intermediate blanking voltage, wherein the level-shifting inverting circuit includes:
a first impedance circuit that is coupled to a first node;
a voltage divider circuit that includes a second impedance circuit and a third impedance circuit, wherein the second and third impedance circuits are coupled together at a voltage divider output node, and wherein the voltage divider circuit is arranged to provide the intermediate blanking voltage at the voltage divider output node; and
a switch circuit that is coupled between the first node and the voltage divider output node, wherein the switch circuit is arranged to open and close based on the blanking logic signal and a first bias voltage such that the first bias voltage acts as a logic threshold of the switch circuit, the switch circuit is closed if the blanking logic signal corresponds to a logic high relative to the logic threshold, and such that the switch circuit is open if the blanking logic signal corresponds to a logic low relative to the logic threshold; and wherein the switch circuit is further arranged to, at least if the switch circuit is closed, provide a second bias voltage to the first node such that the second bias voltage is based, in part, on the first bias voltage.

17. The circuit of claim 16, wherein the switch circuit includes a differential pair, the differential pair includes a first transistor and a second transistor; the first and second transistor each include a gate; the gate of the first transistor is arranged to receive the blanking logic signal; and wherein the gate of the second transistor is arranged to receive a third bias voltage that is based, in part, on the second bias voltage such that the third bias voltage is substantially equal to the second bias voltage if the switch circuit is closed.

18. A method for cathode ray tube blanking, comprising:
providing a blanking logic signal from a video signal such that a logic level of the blanking logic signal corresponds to whether a blanking interval is occurring in the video signal;
providing an intermediate blanking signal from the blanking logic signal such that:
the intermediate blanking voltage is level-shifted relative to the blanking logic signal such that a voltage swing of the intermediate blanking signal is appropriate for blanking of a control grid of a cathode ray tube, and
such that an output transfer characteristic of the intermediate blanking voltage is substantially similar to the output transfer characteristic of a CMOS inverter;
providing an output signal that is based, in part, on the intermediate blanking voltage; and
capacitively coupling the output signal to a control grid of the cathode ray tube.

19. The method of claim 18, wherein the level-shifting of the intermediate blanking signal is accomplished such that the voltage swing of the intermediate blanking signal has a magnitude of at least twenty volts.

20. A method for cathode ray tube blanking, comprising:
providing a blanking logic signal from a video signal such that a logic level of the blanking logic signal corresponds to whether a blanking interval is occurring in the video signal;
providing an intermediate blanking signal from the blanking logic signal such that:
the intermediate blanking voltage is level-shifted relative to the blanking logic signal such that a voltage swing of the intermediate blanking signal is appropriate for blanking of a control grid of a cathode ray tube;
providing an output signal that is based, in part, on the intermediate blanking voltage; and
capacitively coupling the output signal to a control grid of the cathode ray tube, wherein providing the intermediate blanking signal includes:
employing a voltage divider to provide the intermediate blanking voltage; and
if the blanking logic signal is asserted, adjusting the intermediate blanking voltage by diverting a portion of a current that is associated with the voltage divider.

21. The method of claim 20, wherein diverting the portion of the current includes:
providing a first bias voltage;
providing a second bias voltage from the first bias voltage by employing another voltage divider; and
providing a current path to divert the portion of the current if the blanking logic signal is asserted, wherein providing the current path includes providing the blanking logic signal and the second bias voltage to a differential pair.

* * * * *

UNITED STATES PATENT AND TRADEMARK OFFICE
CERTIFICATE OF CORRECTION

PATENT NO. : 7,432,671 B1  Page 1 of 1
APPLICATION NO. : 10/951976
DATED : October 7, 2008
INVENTOR(S) : Hon Kin Chiu It is certified that error appears in the above-identified patent and that said Letters Patent is hereby corrected as shown below:

In column 4, line 11, delete "LSI_LOUT" and insert -- LSI_OUT --, therefor.

In column 4, line 50, delete "R23" and insert -- R13 --, therefor.

In column 4, line 57, delete "R" and insert -- R2 --, therefor.

In column 7, line 33, in Claim 16, after "blanking" insert -- , --.

Signed and Sealed this

Sixth Day of January, 2009

JON W. DUDAS
*Director of the United States Patent and Trademark Office*